US012589962B2

(12) United States Patent
Oishi et al.

(10) Patent No.: US 12,589,962 B2
(45) Date of Patent: Mar. 31, 2026

(54) MEDIUM CONVEYANCE DEVICE AND IMAGE FORMING APPARATUS

(71) Applicant: FUJIFILM Business Innovation Corp., Tokyo (JP)

(72) Inventors: Ryuga Oishi, Kanagawa (JP); Hiroyuki Tamai, Kanagawa (JP); Ryosuke Yamaji, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 288 days.

(21) Appl. No.: 18/177,768

(22) Filed: Mar. 3, 2023

(65) Prior Publication Data

US 2023/0303350 A1 Sep. 28, 2023

(30) Foreign Application Priority Data

Mar. 25, 2022 (JP) ................................ 2022-050472

(51) Int. Cl.
*B65H 5/06* (2006.01)
*G03G 15/00* (2006.01)

(52) U.S. Cl.
CPC ..... *B65H 5/064* (2013.01); *B65H 2404/1341* (2013.01); *B65H 2404/1424* (2013.01);
(Continued)

(58) Field of Classification Search
CPC .... B65H 2404/1341; B65H 2404/1424; B65H 2404/147; B65H 2801/06; B65H 5/064;
(Continued)

(56) References Cited

U.S. PATENT DOCUMENTS 7,686,300 B2 * 3/2010 Watanabe ................ B65H 9/16 271/274
8,454,015 B2 * 6/2013 Lai ......................... B65H 5/062 271/274
(Continued)

FOREIGN PATENT DOCUMENTS

JP 6-16316 * 1/1994
JP 2005330084 12/2005
(Continued)

OTHER PUBLICATIONS

Machine translation of JP6-16316. (Year: 1994).*
(Continued)

*Primary Examiner* — Thomas A Morrison
(74) *Attorney, Agent, or Firm* — JCIPRNET

(57) ABSTRACT

A medium conveyance device includes: a plurality of roller pairs arranged in a width direction of a recording medium, the plurality of roller pairs including at least two end-side roller pairs respectively located near two ends of the recording medium in the width direction and at least one center-side roller pair located near a center of the recording medium in the width direction, the plurality of roller pairs each including a pair of rollers that convey the recording medium while nipping the recording medium and are individually contactable with and separable from each other; and a contact and separation mechanism that moves a first roller of the pair of rollers of the at least one center-side roller pair in a thickness direction of the recording medium or moves a first roller of the pair of rollers of each of the at least two end-side roller pairs in the thickness direction of the recording medium, to make a difference in separation timing.

9 Claims, 7 Drawing Sheets

(52) U.S. Cl.
CPC .... *B65H 2404/147* (2013.01); *B65H 2801/06* (2013.01); *G03G 15/6564* (2013.01); *G03G 2215/004* (2013.01); *G03G 2215/00599* (2013.01); *G03G 2215/00679* (2013.01)

(58) Field of Classification Search
CPC ......... G03G 15/6564; G03G 2215/004; G03G 2215/00599; G03G 2215/00679
USPC .................................................. 271/272–274
See application file for complete search history.

(56) References Cited

U.S. PATENT DOCUMENTS

| | | | | |
|---|---|---|---|---|
| 2008/0042340 | A1* | 2/2008 | Linder .................. | B65H 5/062<br>271/274 |
| 2008/0061499 | A1* | 3/2008 | DeGruchy ............ | B65H 9/006<br>271/273 |

FOREIGN PATENT DOCUMENTS

| | | |
|---|---|---|
| JP | 2010215401 | 9/2010 |
| JP | 2012029143 | 2/2012 |
| JP | 2019026453 | 2/2019 |

OTHER PUBLICATIONS

"Notice of Reasons for Refusal of Japan Counterpart Application", issued on Jan. 6, 2026, with English translation thereof, pp. 1-8.

* cited by examiner

MEDIUM CONVEYANCE DEVICE AND IMAGE FORMING APPARATUS

CROSS-REFERENCE TO RELATED APPLICATIONS

This application is based on and claims priority under 35 USC 119 from Japanese Patent Application No. 2022-050472 filed Mar. 25, 2022.

BACKGROUND

(i) Technical Field

The present invention relates to a medium conveyance device and an image forming apparatus.

(ii) Related Art

JP2005-330084A discloses an image forming apparatus including a pressure adjuster for a conveyance roller. The conveyance roller is disposed on a reconveyance path that is connected to a conveyance path between an image forming section and a downstream side of a fixing section through which a sheet passes at the time of reverse side printing of double-sided printing. The pressure adjuster is configured to correct a skew of the sheet by changing a pressure balance of the conveyance roller in a sheet width direction so as to make a difference in a sheet feed amount in the sheet width direction.

SUMMARY

A plurality of roller pairs are arranged in a width direction of a recording medium to convey the recording medium while nipping the recording medium. In a case where a recording medium to be conveyed is a thin sheet of paper, a conveyance force is occasionally weakened as compared with a case where a recording medium to be conveyed is a thick sheet of paper, in order to inhibit occurrence of wrinkles in the thin sheet of paper.

In such a case, conventionally, each roller pair has been provided with an adjustment mechanism for adjusting the conveyance force.

Aspects of non-limiting embodiments of the present disclosure relates to a medium conveyance device and an image forming apparatus that adjust a conveyance force for conveying a recording medium while stabilizing an orientation of the recording medium conveyed, without a necessity that an adjustment mechanism is provided for each roller pair in order to adjust the conveyance force.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a medium conveyance device including: a plurality of roller pairs arranged in a width direction of a recording medium, the plurality of roller pairs including at least two end-side roller pairs respectively located near two ends of the recording medium in the width direction and at least one center-side roller pair located near a center of the recording medium in the width direction, the plurality of roller pairs each including a pair of rollers that convey the recording medium while nipping the recording medium and are individually contactable with and separable from each other; and a contact and separation mechanism that moves a first roller of the pair of rollers of the at least one center-side roller pair in a thickness direction of the recording medium or moves a first roller of the pair of rollers of each of the at least two end-side roller pairs in the thickness direction of the recording medium, to make a difference in separation timing.

DETAILED DESCRIPTION

First Exemplary Embodiment

Figure 1:
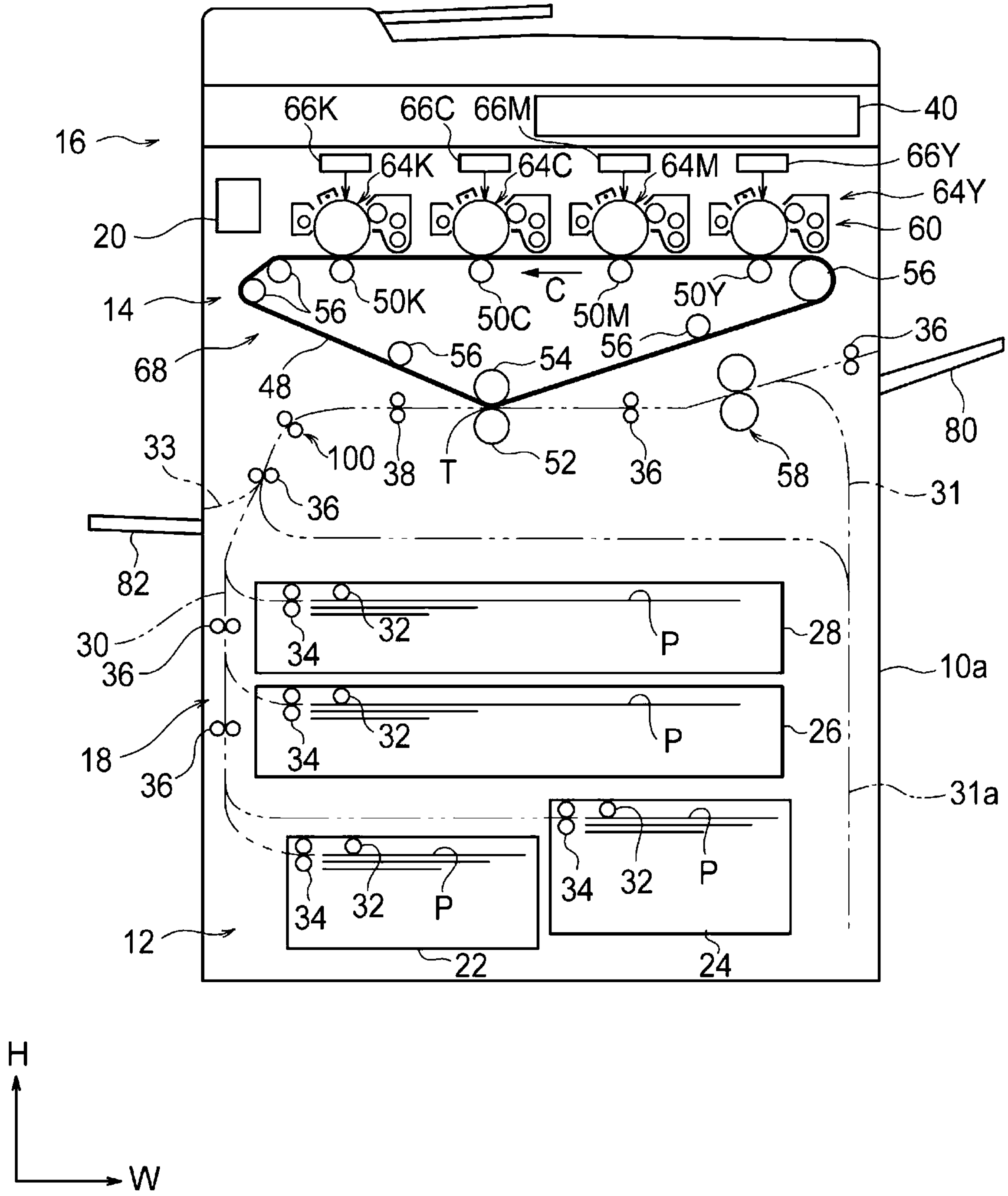
FIG. 1 is a schematic configuration diagram illustrating an image forming apparatus according to a first exemplary embodiment of the present disclosure.

With reference to FIGS. 1 to 6B, a description will be given of examples of a medium conveyance device and an image forming apparatus according to a first exemplary embodiment of the present disclosure. In the drawings, an arrow H is directed vertically and indicates an apparatus height direction, and an arrow W is directed horizontally and indicates an apparatus width direction.

(Overall Configuration of Image Forming Apparatus 10)

As illustrated in FIG. 1, an image forming apparatus 10 includes a sheet accommodation section 12, a main operation section 14, a document reading section 16, and a display section 40 that are disposed in this order from a lower side to an upper side in the apparatus height direction. The image forming apparatus 10 also includes a conveyance section 18 that conveys sheet members P each of which is an example of a recording medium, and a management section 20 that manages the operation of each section.

The sheet accommodation section 12 accommodates the sheet members P. The main operation section 14 forms an image on each sheet member P conveyed from the sheet accommodation section 12. The document reading section 16 reads an image of a document. The display section 40 displays a screen on which a user exchanges information with the image forming apparatus 10.

[Sheet Accommodation Section 12]

As illustrated in FIG. 1, the sheet accommodation section 12 includes a first accommodation section 22, a second accommodation section 24, a third accommodation section 26, and a fourth accommodation section 28 that are capable of accommodating the sheet members P of different sizes. Each of the first accommodation section 22, the second accommodation section 24, the third accommodation section 26, and the fourth accommodation section 28 includes a feed roller 32 that feeds the accommodated sheet members P one by one, and a multi feeding prevention roller 34 that conveys the fed sheet members P to a conveyance path 30 in the image forming apparatus 10 one by one.

[Conveyance Section 18]

As illustrated in FIG. 1, the conveyance section 18 includes a plurality of conveyance rollers 36 that receive the sheet members P from the multi feeding prevention roller 34 and convey the sheet members P one by one along the conveyance path 30. The conveyance section 18 also includes a registration roller 38 that is disposed upstream of a transfer position T (to be described later) in a conveyance direction of the sheet members P (hereinafter, simply referred to as "a sheet conveyance direction"). The registration roller 38 temporarily stops the sheet members P, and feeds the sheet members P to a secondary transfer position at a predetermined timing. The conveyance section 18 also includes a medium conveyance device 100 that receives the sheet members P from the conveyance rollers 36 and delivers the sheet members P to the registration roller 38.

An upstream portion of the conveyance path 30 in the sheet conveyance direction extends upward from below at one side in the apparatus width direction. A downstream portion of the conveyance path 30 in the sheet conveyance direction extends from one side to the other side in the apparatus width direction, and reaches a discharge section 80 through which the sheet members P are discharged externally from an apparatus main body 10*a*. The medium conveyance device 100 described above is disposed at a portion where the conveyance direction of the sheet members P changes. The medium conveyance device 100 will be described in detail later.

A duplex conveyance path 31 is connected to a downstream end of the conveyance path 30 in the sheet conveyance direction. On the duplex conveyance path 31, each sheet member P is conveyed and reversed such that an image is formed on the reverse side of the sheet member P.

The duplex conveyance path 31 includes a switchback path 31*a*. Each sheet member P fed from the switchback path 31*a* is reversed upside down and is fed to an upper end of the upstream portion in the sheet conveyance direction in the conveyance path 30.

A manual feed path 33 is connected to the upper end of the upstream portion of the conveyance path 30 in the sheet conveyance direction. A sheet member P supplied from a manual feed section 82 disposed outside the apparatus main body 10*a* is conveyed on the manual feed path 33.

[Main Operation Section 14]

As illustrated in FIG. 1, the main operation section 14 includes an image forming section 60 that forms a toner image, a transfer unit 68 that transfers the toner image to each sheet member P, and a fixing device 58 that fixes the toner image formed on the sheet member P, to the sheet member P.

—Image Forming Section 60—

The image forming section 60 includes image forming units 64K, 64C, 64M, and 64Y that respectively form toner images of black (K), cyan (C), magenta (M), and yellow (Y). In the following description, in a case where the image forming units 64K, 64C, 64M, 64Y are not necessarily distinguished from one another, the image forming units 64K, 64C, 64M, 64Y are collectively referred to as image forming units 64 in some cases.

Figure 2:
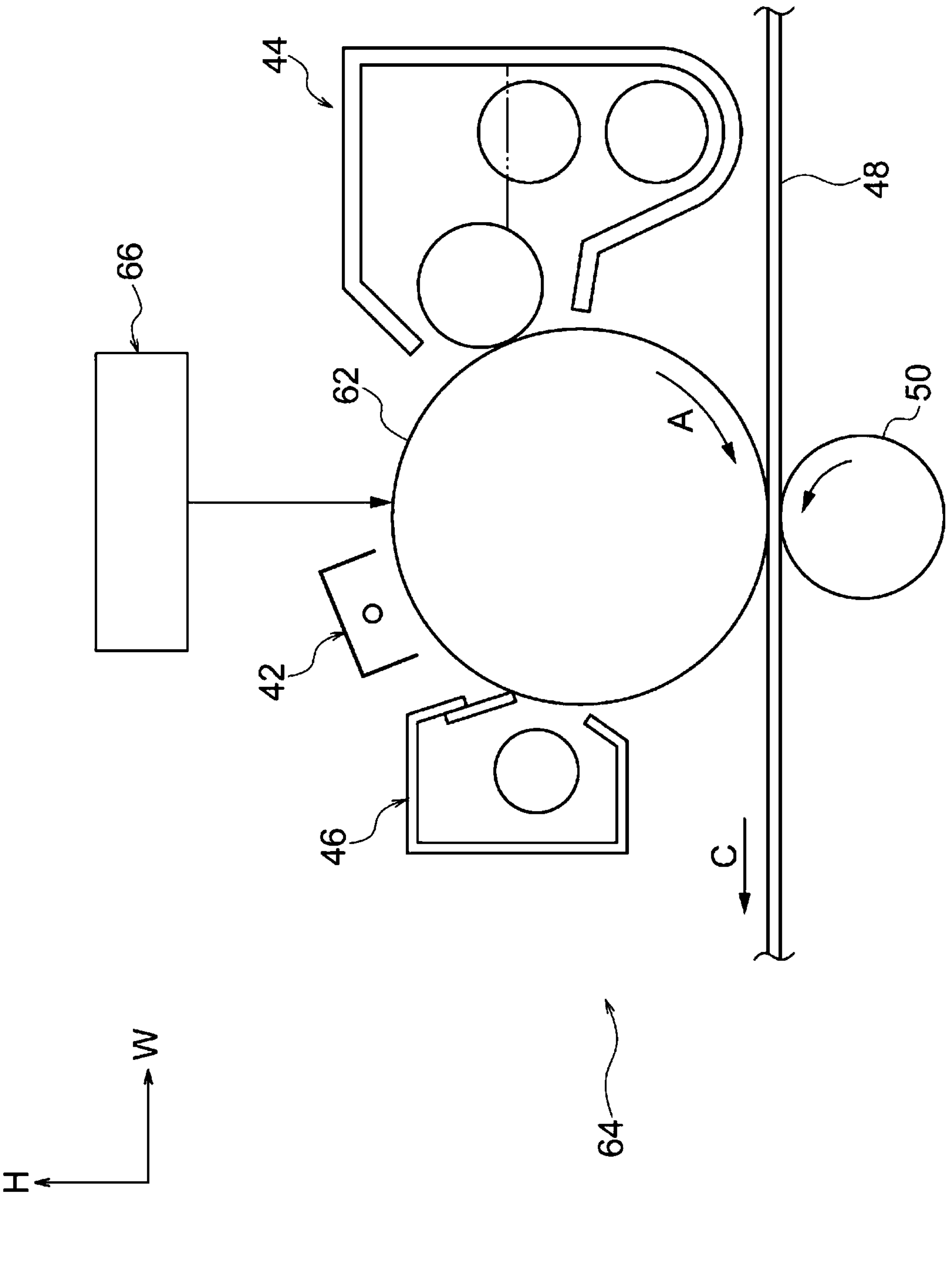
FIG. 2 is a schematic configuration diagram illustrating an image forming unit of the image forming apparatus according to the first exemplary embodiment of the present disclosure.

As illustrated in FIG. 2, each of the image forming units 64 includes a photoconductor drum 62 that has a cylindrical shape and rotates in a direction indicated by an arrow A in FIG. 2, a charger 42 that charges the photoconductor drum 62, a developer 44 that develops an electrostatic latent image (to be described later) to visualize the electrostatic latent image as a toner image, and a cleaning member 46.

The image forming section 60 also includes exposure devices 66K, 66C, 66M, and 66Y (see FIG. 1) that respectively irradiate the photoconductor drums 62 charged by the chargers 42, with exposure light to form electrostatic latent images.

In this configuration, the chargers 42 charge the rotating photoconductor drums 62, and the exposure devices 66 irradiate the charged photoconductor drums 62 with the exposure light to form the electrostatic latent images. The developers 44 then develop the electrostatic latent images to visualize the electrostatic latent images as toner images.

—Transfer Unit 68—

As illustrated in FIG. 1, the transfer unit 68 includes an endless transfer belt 48, a primary transfer roller 50 that transfers a toner image from each photoconductor drum 62 (see FIG. 2) to the transfer belt 48, and a secondary transfer roller 52 that transfers the toner image on the transfer belt 48 to each sheet member P. The transfer unit 68 also includes an auxiliary roller 54 that is disposed opposite the secondary transfer roller 52 across the transfer belt 48, and a plurality of rollers 56 around which the transfer belt 48 is wound.

The transfer belt 48 has a triangular shape with its vertex pointing downward as seen in an apparatus depth direction, and a base of the triangular transfer belt 48 is sandwiched between the photoconductor drum 62 and the primary transfer roller 50. The vertex of the triangular transfer belt 48 is sandwiched between the secondary transfer roller 52 and the auxiliary roller 54.

One of the plurality of rollers 56 functions as a drive roller that revolves the transfer belt 48 in a direction indicated by an arrow C in the drawings.

(Operation of Image Forming Apparatus)

The image forming apparatus 10 forms an image as follows.

First, the chargers 42 (see FIG. 2) for the respective colors uniformly negatively charge surfaces of the rotating photoconductor drums 62 for the respective colors at a predetermined potential. Next, based on image data read by the document reading section 16 (see FIG. 1), the exposure devices 66 (see FIG. 1) for the respective colors irradiate the charged surfaces of the photoconductor drums 62 for the respective colors with exposure light to form electrostatic latent images.

Thus, the electrostatic latent images corresponding to the image data are formed on the surfaces of the photoconductor drums 62 for the respective colors. Further, the developers 44 for the respective colors develop the electrostatic latent images to visualize the electrostatic latent images as toner images. The toner images formed on the surfaces of the photoconductor drums 62 for the respective colors are sequentially transferred to the transfer belt 48 by the primary transfer rollers 50.

Each sheet member P fed from one of the first accommodation section 22, the second accommodation section 24, the third accommodation section 26, and the fourth accommodation section 28 (see FIG. 1) to the conveyance path 30 by the corresponding feed roller 32 is fed to the transfer position T where the transfer belt 48 and the secondary transfer roller 52 are in contact with each other. When the sheet member P is conveyed between the transfer belt 48 and the secondary transfer roller 52 at the transfer position T, the toner image on the transfer belt 48 is transferred to the sheet member P.

The fixing device 58 fixes the toner image transferred to the sheet member P, to the sheet member P. The sheet member P to which the toner image has been fixed is discharged externally from the apparatus main body 10*a* toward the discharge section 80.

(Main Configuration)

Next, a description will be given of the medium conveyance device 100.

As illustrated in FIG. 1, the medium conveyance device 100 is disposed at a portion where the conveyance direction of the sheet members P changes. In other words, the medium conveyance device 100 is disposed at a portion where the conveyance path 30 is curved as seen in the apparatus depth direction. In other words, the medium conveyance device 100 is disposed at a portion where the direction in which the conveyance path 30 extends changes.

In the present exemplary embodiment, the medium conveyance device 100 is disposed at a portion where the conveyance direction of the sheet members P changes from the apparatus height direction to the apparatus width direction. As described above, the medium conveyance device 100 is disposed at a portion where a strong conveyance force is required in conveying a thick sheet of paper and where a thin sheet of paper, when being conveyed with the same strong conveyance force as that for the thick sheet of paper, undergoes wrinkles, damages, and roller marks.

Figure 3:
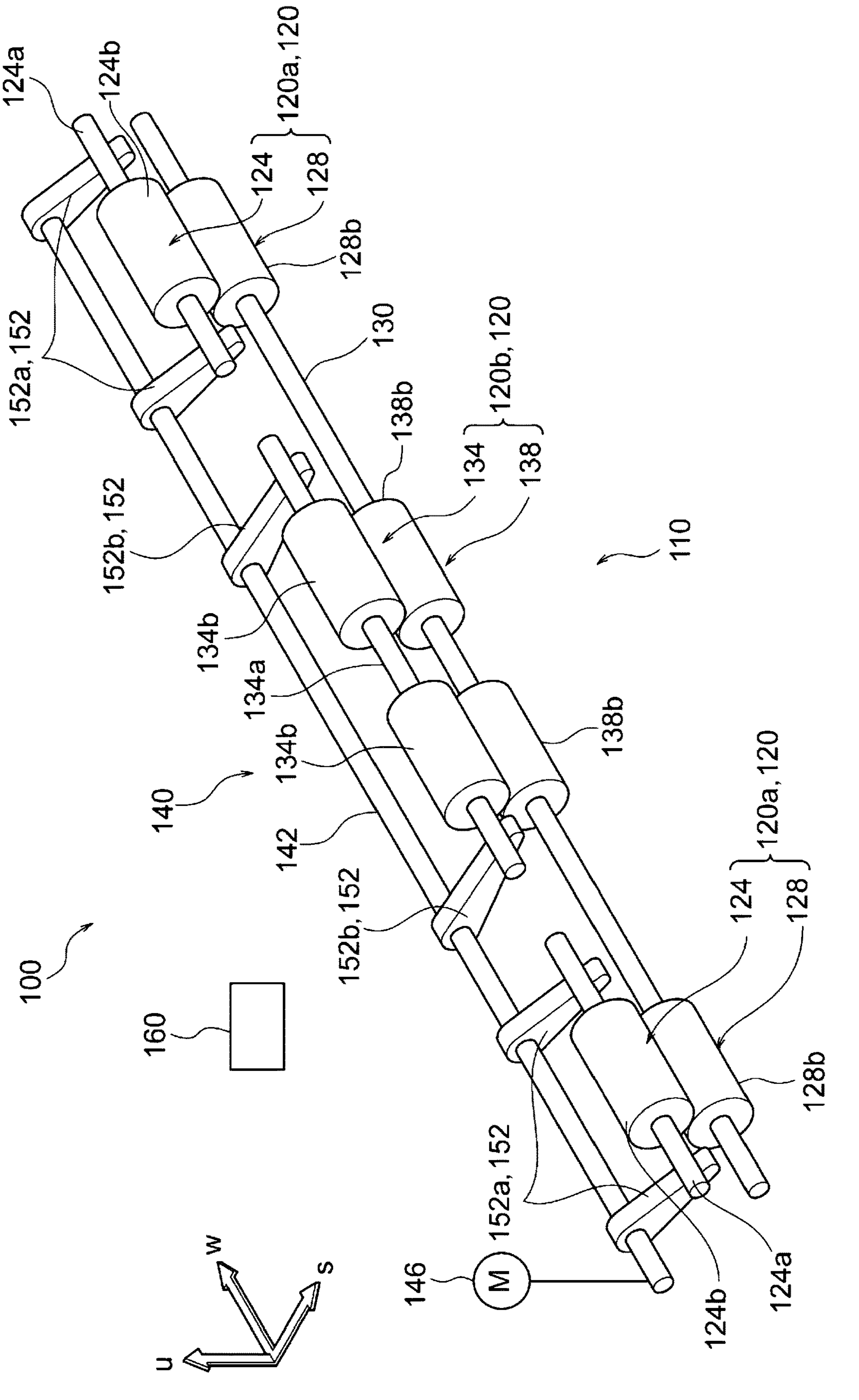
FIG. 3 is a perspective view illustrating a medium conveyance device according to the first exemplary embodiment of the present disclosure.

As illustrated in FIG. 3, the medium conveyance device 100 includes a delivery roller member 110, a contact and separation mechanism 140, and a controller 160 that controls each section. In FIGS. 3 to 6B, an arrow S indicates the conveyance direction (hereinafter, referred to as "a medium conveyance direction") of the sheet members P conveyed by the medium conveyance device 100. Also in FIGS. 3 to 6B, an arrow W indicates a width direction (hereinafter, referred to as "a medium width direction") of the sheet members P conveyed by the medium conveyance device 100. The medium width direction is orthogonal to the medium conveyance direction. Also in FIGS. 3 to 6B, an arrow U indicates a thickness direction (hereinafter referred to as "a medium thickness direction") of the sheet members P conveyed by the medium conveyance device 100. The medium thickness direction is orthogonal to the medium conveyance direction and the medium width direction. The medium conveyance direction is the same direction as a tangential direction at a position where the delivery roller member 110 nips each sheet member P on the conveyance path 30. The medium width direction is the same direction as the apparatus depth direction.

[Delivery Roller Member 110]

As illustrated in FIG. 3, the delivery roller member 110 includes a plurality of roller pairs 120 that are arranged in the medium width direction. The plurality of roller pairs 120 are divided into roller pairs 120*a* respectively disposed at both sides of the medium width direction and roller pairs 120*b* disposed at a center side of the medium width direction. In the following description, in a case where the roller pairs 120*a* and the roller pairs 120*b* are not necessarily distinguished from each other, the roller pairs 120*a* and the roller pairs 120*b* are collectively referred to as the roller pairs 120 in some cases.

—Roller Pair 120*a*—

Each of the roller pairs 120*a* includes a roller 124 that comes into contact with a front side of each sheet member P, and a roller 128 that comes into contact with a reverse side of each sheet member P. The roller pair 120*a* is an example of an end-side roller pair. The roller 124 is an example of one roller. The roller 128 is an example of the other roller.

The roller 124 includes a shaft portion 124*a* and a cylindrical portion 124*b* through which the shaft portion 124*a* passes and that is formed of a resin material. The shaft portion 124*a* is movably supported by a guide member (not illustrated) such that the roller 124 is movable in the medium thickness direction. The roller 124 also includes a biasing member (not illustrated) that biases the shaft portion 124*a* toward the roller 128 in the medium thickness direction.

The roller 128 includes a shaft portion 130 and a cylindrical portion 128*b* through which the shaft portion 130 passes and that is formed of an elastic material. The shaft portion 130 extends from one side to the other side in the medium width direction.

—Roller Pair 120*b*—

Each of the roller pairs 120*b* includes a roller 134 that comes into contact with the front side of each sheet member P, and a roller 138 that comes into contact with the reverse side of each sheet member P. The roller pair 120*b* is an example of a center-side roller pair. The roller 134 is an example of a first roller. The roller 138 is an example of a second roller.

The roller 134 includes a shaft portion 134*a* and a pair of cylindrical portions 134*b* through which the shaft portion 134*a* passes, that are formed of a resin material, and that are arranged in the medium width direction. The shaft portion 134*a* is movably supported by a guide member (not illustrated) such that the roller 134 is movable in the medium thickness direction. The roller 134 also includes a biasing member (not illustrated) that biases the shaft portion 134*a* toward the roller 138 in the medium thickness direction.

The roller 138 includes the shaft portion 130 and a pair of cylindrical portions 138*b* through which the shaft portion 130 passes, that are formed of an elastic material, and that are arranged in the medium width direction.

As described above, the shaft portion 130 is a common constituent member of the rollers 138 and rollers 128. That is, the cylindrical portions 128*b* are respectively disposed on the two ends of the shaft portion 130 in the medium width direction, and the two cylindrical portions 138*b* arranged in the medium width direction are disposed at the center of the shaft portion 130 in the medium width direction.

The shaft portion 130 receives a torque from a driver (not illustrated) so that the rollers 128 and the rollers 138 rotate. In this manner, the rollers 128 and the rollers 138 function as drive rollers.

[Contact and Separation Mechanism 140]

As illustrated in FIG. 3, the contact and separation mechanism 140 includes a shaft portion 142 that extends in the medium width direction, a driver 146 that rotates the shaft portion 142, and a plurality of arm portions 152 each having a proximal end fixed to the shaft portion 142. The driver 146 is an example of a rotator.

—Shaft Portion 142, Driver 146—

Figures 4A, 4B:
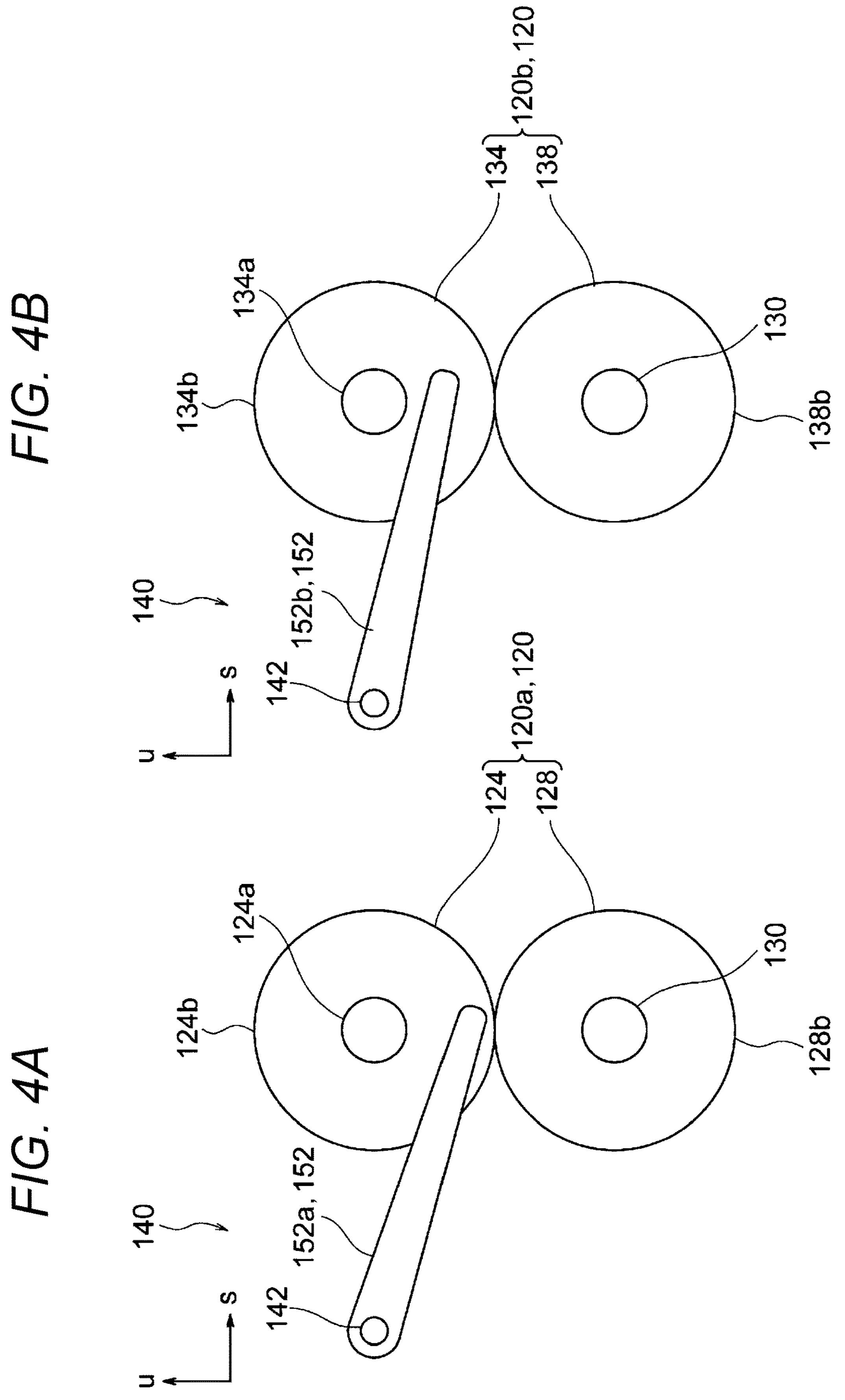
FIGS. 4A and 4B are side views each illustrating a roller pair and a contact and separation mechanism of the medium conveyance device according to the first exemplary embodiment of the present disclosure.

As illustrated in FIGS. 3, 4A, and 4B, the shaft portion 142 is disposed on a first side in the medium conveyance direction with respect to the shaft portions 124*a* and 134*a*, and extends from one side to the other side in the medium width direction.

The driver 146 is a stepping motor and operates under the control by the controller 160 to rotate the shaft portion 142. The control on each section by the controller 160 will be described together with operation later.

—Arm Portion 152—

As illustrated in FIG. 3, the arm portions 152 are spaced from each other in the medium width direction with the proximal ends fixed to the shaft portion 142. The arm portions 152 each have a distal end that extends toward the rollers 124 and 134.

The plurality of arm portions 152 include arm portions 152*a* having distal ends respectively disposed on two sides of each roller 124 in the medium width direction, and arm portions 152*b* having distal ends disposed on two sides of the roller 134 in the medium width direction. Each of the arm portions 152*a* is an example of another arm portion. In the following description, in a case where the arm portions 152*a* and the arm portions 152*b* are not necessarily distinguished from each other, the arm portions 152*a* and the arm portions 152*b* are collectively referred to as the arm portions 152 in some cases.

As illustrated in FIGS. 4A and 4B, specifically, the distal ends of the arm portions 152 are located toward the shaft portion 130 with respect to the shaft portions 124*a* and 134*a* are.

In addition, the rollers 124 and 134 are respectively in contact with the rollers 128, and 138 with the distal ends of the arm portions 152 separated from the shaft portions 124*a* and 134*a*. In this state, a distance from the distal end of each arm portion 152*a* to the corresponding shaft portion 124*a* is longer than a distance from the distal end of each arm portion 152*b* to the corresponding shaft portion 134*a*. In other words, an inclination angle of each arm portion 152*a* relative to the medium conveyance direction is larger than an inclination angle of each arm portion 152*b* relative to the medium conveyance direction.

Figure 5B:
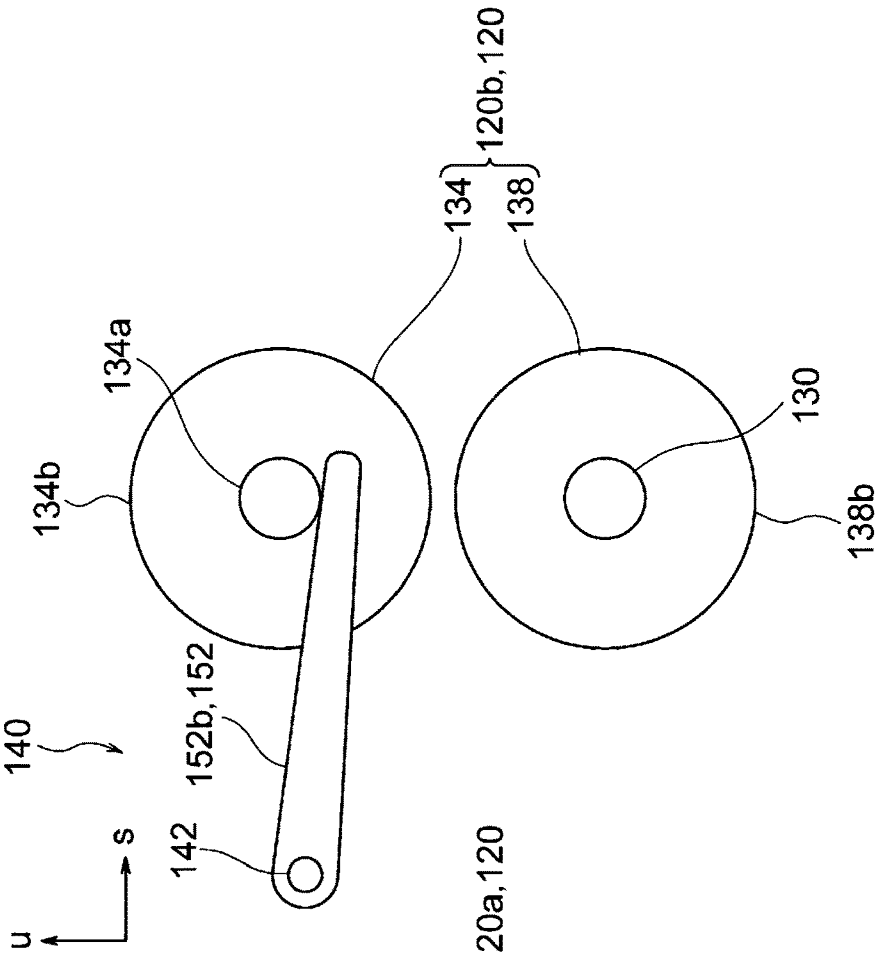
FIGS. 5A and 5B are side views each illustrating the roller pair and the contact and separation mechanism of the medium conveyance device according to the first exemplary embodiment of the present disclosure.
Figure 5A:
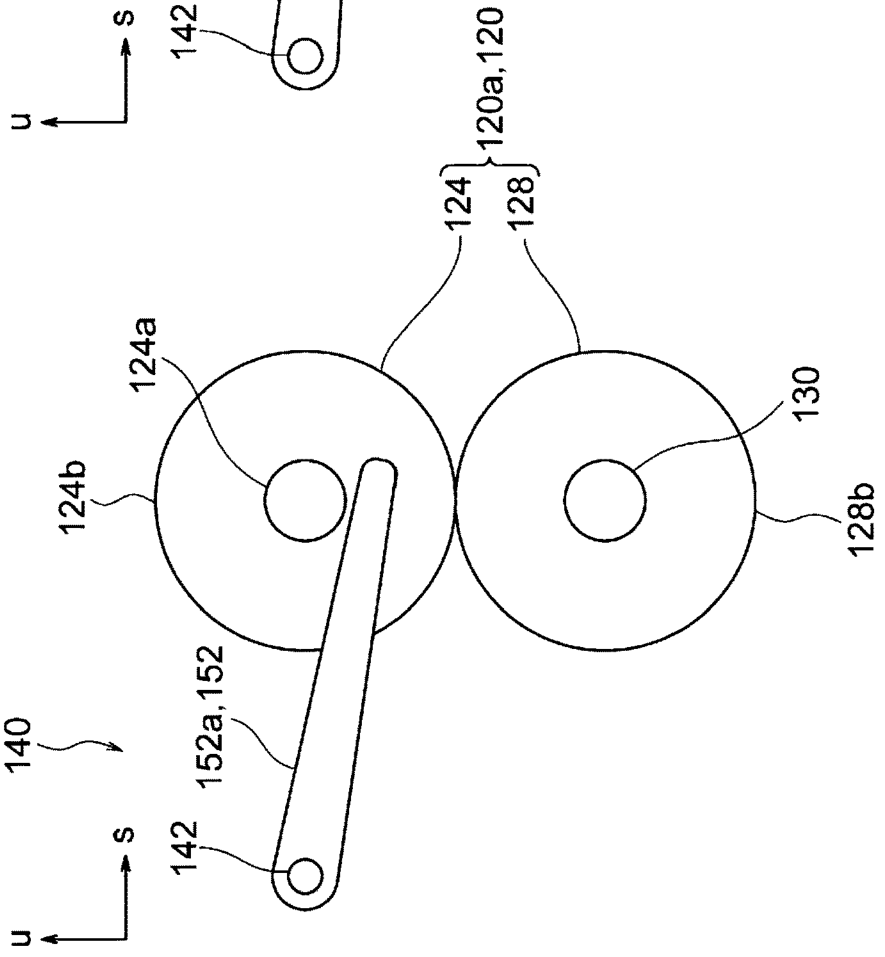
Figure 6B:
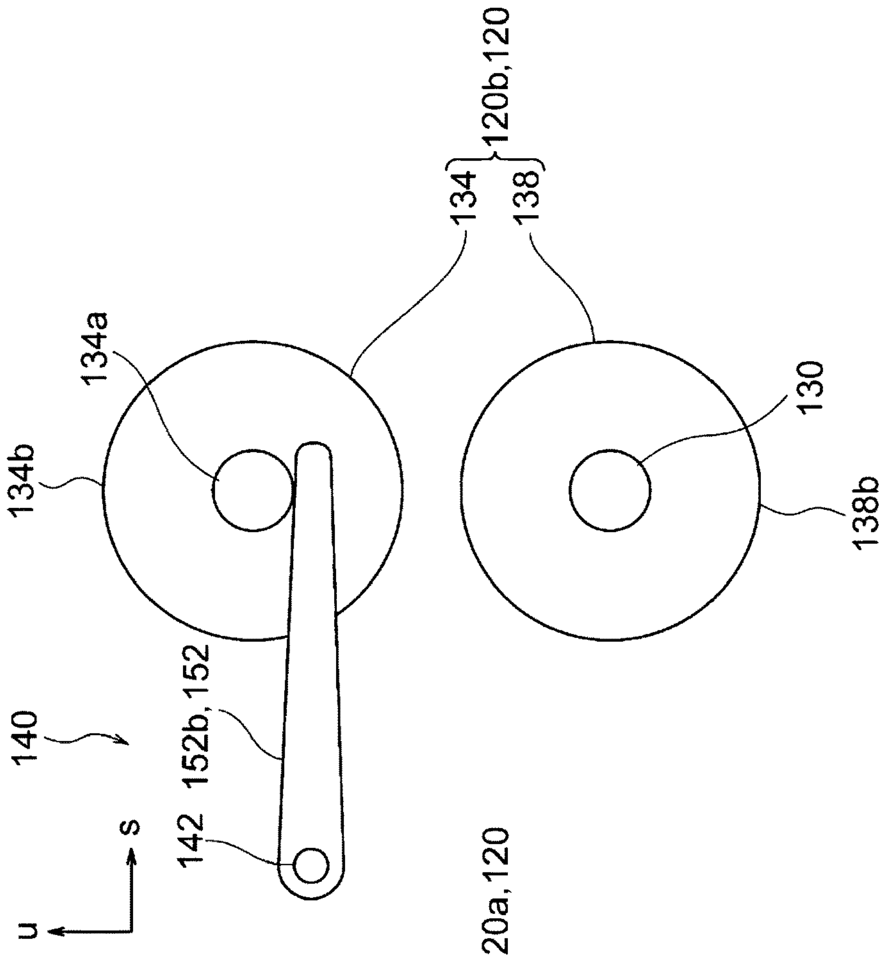
FIGS. 6A and 6B are side views each illustrating the roller pair and the contact and separation mechanism of the medium conveyance device according to the first exemplary embodiment of the present disclosure.
Figure 6A:
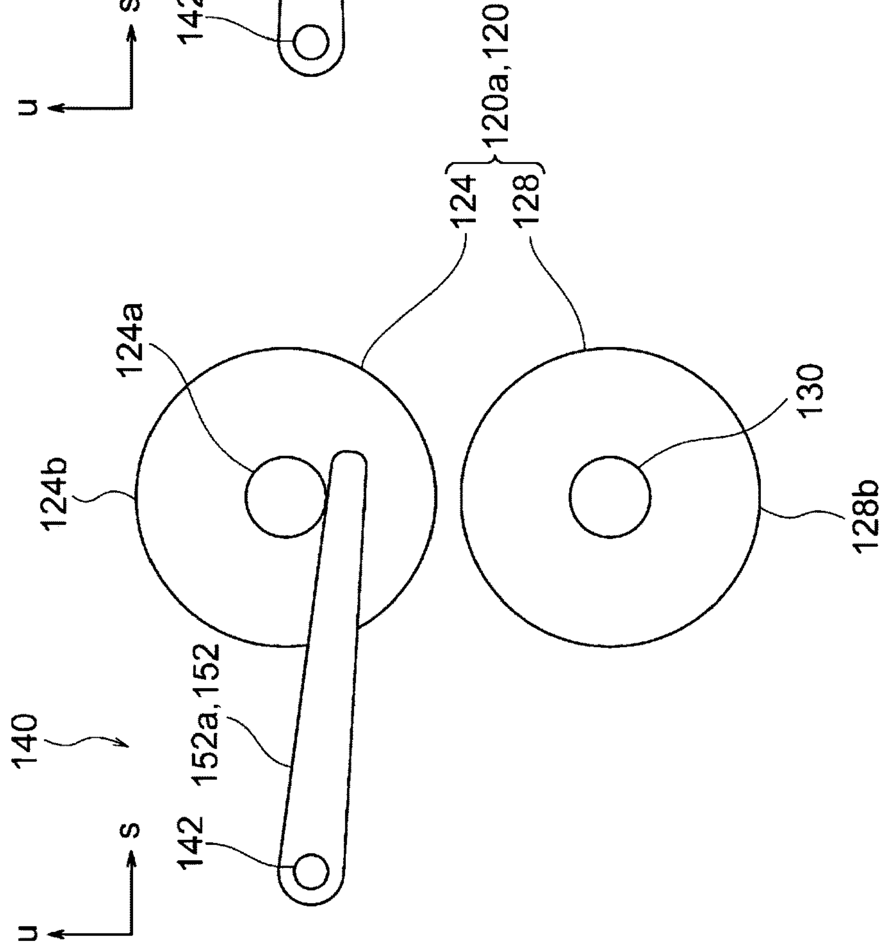

In this configuration, the contact and separation mechanism 140 rotates the shaft portion 142 to switch among a state in which the rollers of each roller pair 120 are in contact with each other (see FIGS. 4A and 4B), a state in which the rollers of each roller pair 120*b* are separated from each other (see FIGS. 5A and 5B), and a state in which the rollers of each roller pair 120 are separated from each other (see FIGS. 6A and 6B).

(Operation of Main Configuration)

Next, a description will be given of operation of the main configuration. Before execution of a print job for forming a toner image on each sheet member P, the contact and separation mechanism 140 brings the rollers of each roller pair 120 into contact with each other as illustrated in FIGS. 4A and 4B.

When a user operates the image forming apparatus 10 to execute the print job, the controller 160 illustrated in FIG. 3 rotates the rollers 128 and rollers 138 that function as drive rollers. Further, the controller 160 obtains paper type information on the sheet members P to be conveyed. Specifically, the user inputs the paper type information on the sheet members P accommodated in each of the accommodation sections 22, 24, 26, and 28 illustrated in FIG. 1, to the image forming apparatus 10 in advance. The controller 160 thus obtains paper type information on the accommodation section accommodating the sheet members P to be used by the print job.

[Case where Sheet Member P is Thin Sheet of Paper]

First, a description will be given of a case where each sheet member P is a thin sheet of paper. As used herein, a thin sheet of paper refers to, for example, a sheet member P having a basis weight that is equal to or less than 52 g/m$^2$.

When the controller 160 illustrated in FIG. 3 obtains paper type information indicating that each sheet member P to be conveyed is a thin sheet of paper, then the controller 160 causes the driver 146 to rotate the shaft portion 142. When the shaft portion 142 rotates, the arm portions 152*a* and 152*b* turn as illustrated in FIGS. 4A to 5B.

The distal ends of the turning arm portions 152*b* come into contact with the shaft portion 134*a* from a lower surface of a sheet of paper, and the arm portions 152*b* move the shaft portion 134*a* such that the shaft portion 134*a* moves away from the shaft portion 130 (see FIG. 5B). The distal ends of the turning arm portions 152*a* come close to the shaft portion 124*a*, but do not come into contact with the shaft portion 124*a* (see FIG. 5A).

Accordingly, the rollers of each of the roller pairs 120*a* respectively disposed on the two ends in the medium width direction come into contact with each other, and the rollers of each of the roller pairs 120*b* disposed at the center in the medium width direction are separated from each other. Each sheet member P is then conveyed while being nipped between the rollers of each of the roller pairs 120*a* respectively disposed on the two ends in the medium width direction. In other words, each sheet member P is conveyed with a conveyance force weaker than a conveyance force to be applied in a case where each sheet member P is conveyed while being nipped between the rollers of each roller pair 120.

[Case where Sheet Member P is Thicker than Thin Sheet of Paper]

Next, a description will be given of a case where each sheet member P is thicker than the thin sheet of paper. As used herein, a sheet of paper thicker than the thin sheet of paper refers to, for example, a sheet member P having a basis weight that is larger than 52 g/m$^2$.

When the controller 160 illustrated in FIG. 3 obtains paper type information indicating that each sheet member P to be conveyed is a sheet member P that is thicker than the thin sheet of paper, then the controller 160 causes the rollers of each roller pair 120 to be kept in contact with each other without operating the driver 146 (see FIGS. 4A and 4B).

Accordingly, each sheet member P is conveyed while being nipped between the rollers of each of the roller pairs 120*a* respectively disposed on the two ends in the medium width direction and the rollers of each of the roller pairs 120*b* disposed at the center in the medium width direction. In other words, each sheet member P is conveyed with a conveyance force stronger than a conveyance force to be applied in a case where each sheet member P is conveyed while being nipped between the rollers of each of the roller pairs 120*a* respectively disposed on the two ends in the medium width direction.

[Case where Leading Edge of Sheet Member P to be Conveyed Collides with Registration Roller 38]

Next, a description will be given of a case where the leading edge of each sheet member P conveyed by the medium conveyance device 100 collides with the registration roller 38.

As illustrated in FIG. 1, the registration roller 38 is disposed downstream of the medium conveyance device 100 in the sheet conveyance direction.

The leading edge of the sheet member P conveyed by the medium conveyance device 100 collides with the registration roller 38 that is not rotating. Then, the medium conveyance device 100 temporarily stops the leading edge of the sheet member P and corrects the skew of the sheet member P. The registration roller 38 then rotates to feed the sheet member P toward the transfer position T.

Specifically, when the leading edge of the sheet member P collides with the registration roller 38, the conveyed sheet member P is bent, and the leading edge of the sheet member P is pressed against the registration roller 38 by a force that causes the sheet member P to return to a flat shape. The skew of the sheet member P is thus corrected.

When the leading edge of the sheet member P collides with the registration roller 38, the conveyed sheet member P is bent. However, if the sheet member P is bent largely, the bent portion does not return to its original shape.

Therefore, when a predetermined period of time has elapsed after the leading edge of the sheet member P has collided with the registration roller 38, the controller 160 illustrated in FIG. 3 causes the driver 146 to rotate the shaft portion 142. When the shaft portion 142 rotates, the arm portions **152*a* and 152*b* turn as illustrated in FIGS. 4A to 6**B.

The distal ends of the turning arm portions **152*b* come into contact with the shaft portion 134*a* from a lower surface of a sheet of paper, and the arm portions 152*b* move the shaft portion 134*a* such that the shaft portion 134*a* moves away from the shaft portion 130 (see FIG. 6B). In addition, the distal ends of the turning arm portions 152*a* come into contact with the shaft portion 124*a* from a lower surface of a sheet of paper, and the arm portions 152*a* move the shaft portion 124*a* such that the shaft portion 124*a* moves away from the shaft portion 130 (see FIG. 6**A).

The rollers of each roller pair 120 are thus separated from each other. In other words, the state of the rollers of each roller pair 120 nipping the sheet member P is released. In other words, the medium conveyance device 100 loses its conveyance force applied to the sheet member P.

(Summary)

As described above, according to the medium conveyance device 100, in the case where each sheet member P to be conveyed is the thin sheet of paper, the sheet member P is conveyed while being nipped between the rollers of each of the roller pairs **120*a* respectively disposed on the two ends in the medium width direction in the state in which the rollers of each of the roller pairs 120*b* disposed at the center in the medium width direction are separated from each other. In contrast, in the case where each sheet member P to be conveyed is thicker than the thin sheet of paper, the rollers of each of the roller pairs 120 are brought into contact with each other, so that the sheet member P is conveyed while being nipped by the rollers of each roller pair 120**.

Thus, the conveyance force for conveying the sheet members P is adjusted without a necessity that an adjustment mechanism is provided for each roller pair in order to adjusting the conveyance force.

The medium conveyance device 100 is disposed at the portion where the conveyance direction of the sheet members P changes. The conveyance force to be applied in the case where each sheet member P to be conveyed is the thin sheet of paper is weaker than the conveyance force to be applied in the case where each sheet member P to be conveyed is thicker than the thin sheet of paper. This configuration therefore inhibits occurrence of defects such as wrinkles in a thin sheet of paper, as compared with a case where a thin sheet of paper is conveyed with the same conveyance force as that to be applied to a sheet of paper thicker than the thin sheet of paper.

In addition, according to the medium conveyance device 100, in the case where each sheet member P to be conveyed is the thin sheet of paper, the sheet member P is conveyed while being nipped between the rollers of each of the roller pairs **120*a*** respectively disposed on the two ends in the medium width direction. This configuration therefore stabilizes the orientation of each sheet member P to be conveyed, as compared with a case where each sheet member P is conveyed while being nipped between the rollers of each of the roller pairs disposed at the center in the medium width direction.

In the medium conveyance device 100, the contact and separation mechanism 140 includes the shaft portion 142, the driver 146 that generates a torque for rotating the shaft portion 142, and the arm portions **152*b* having the proximal ends fixed to the shaft portion 142**. This configuration is therefore simpler than, for example, a configuration that moves rollers with a solenoid.

In the medium conveyance device 100, the arm portions **152*b* are respectively disposed on the two ends of the roller 134 in the medium width direction. This configuration therefore stabilizes the orientation of the roller 134** to be moved, as compared with a case where an arm portion is disposed only on one side in the medium width direction.

In the medium conveyance device 100, the contact and separation mechanism 140 can switch the roller pairs 120 to the state in which the rollers of each roller pair 120 are separated from each other. In other words, the regulation of each sheet member P by the roller pairs 120 is released. This configuration therefore inhibits each sheet member P from being bent excessively with the conveyance of the sheet member P stopped forcibly at the time when the leading edge of the sheet member P collides with the registration roller 38 disposed downstream of the medium conveyance device 100 in the sheet conveyance direction, as compared with a case where each sheet member P is conveyed while being nipped between the rollers of each roller pair all the time.

Second Exemplary Embodiment

Figures 7A, 7B, 7C:
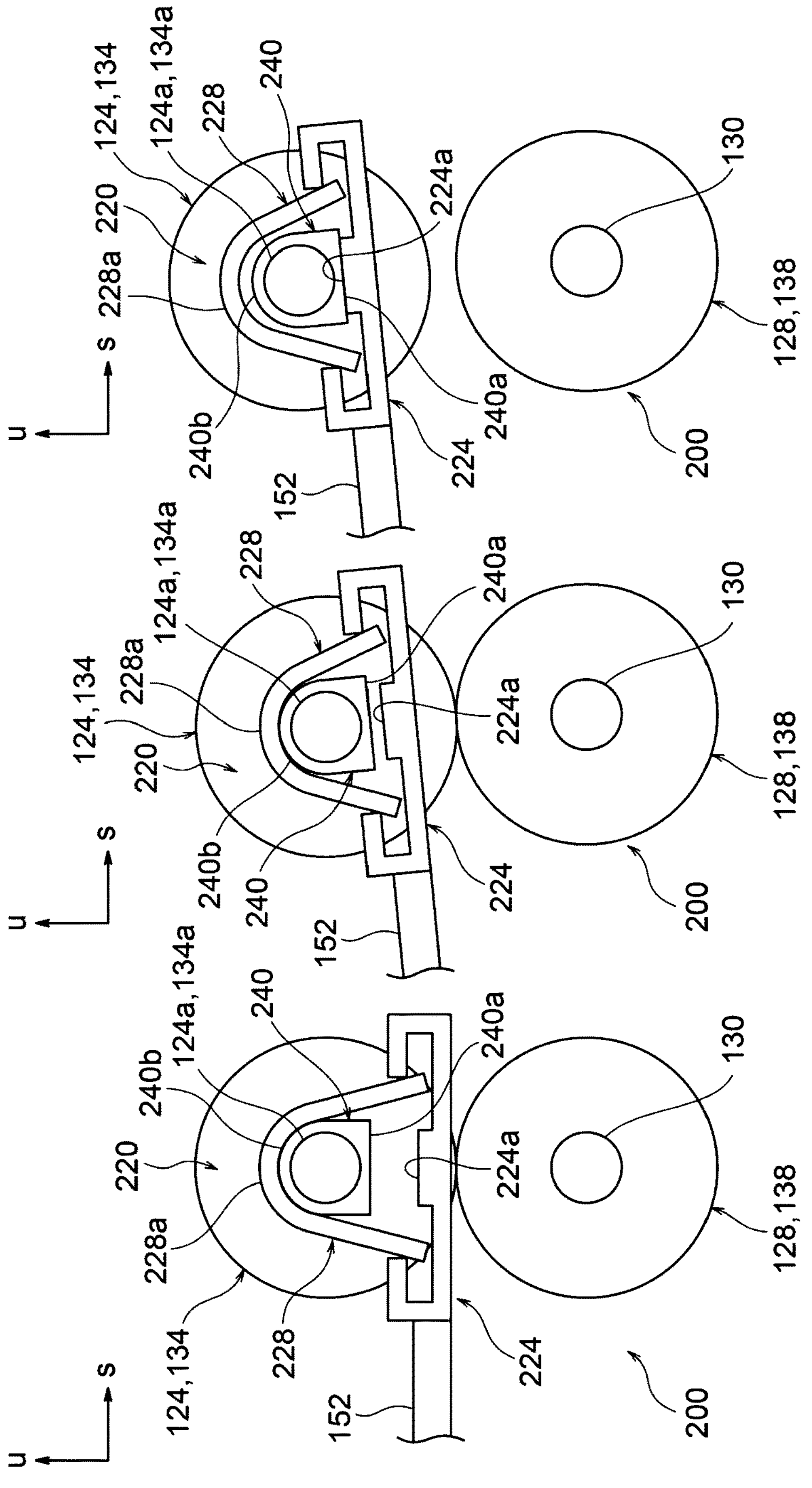
FIGS. 7A, 7B, and 7C are side views each illustrating a roller pair and the like of a medium conveyance device according to a second exemplary embodiment of the present disclosure.

With reference to FIGS. 7A to 7C, next, a description will be given of examples of a medium conveyance device and an image forming apparatus according to a second exemplary embodiment of the present disclosure. The following description mainly concerns a difference between the second exemplary embodiment and the first exemplary embodiment.

(Configuration)

As illustrated in FIG. 7A, in a medium conveyance device 200 according to the second exemplary embodiment, a biasing member 220 that applies a biasing force is mounted to a distal end of an arm portion 152. The biasing member 220 includes a main body 224 and a plate spring 228 mounted to the main body 224. The plate spring 228 is an example of an elastic member. In the second exemplary embodiment, the distal end of the arm portion 152 and a roller pair 120 come into contact with each other with the biasing member 220 interposed therebetween.

[Main Body 224]

The main body 224 is located closer to a shaft portion 130 than shaft portions **124*a* and 134*a* are, as seen in the medium width direction. The main body 224 has a "C" shape that is open toward the shaft portions 124*a* and 134*a*. The main body 224 includes a protrusion 224*a* that faces or is in contact with, in the medium thickness direction, bearings 240 mounted to the shaft portions 124*a* and 134*a***.

The bearings 240 mounted to the shaft portions 124*a* and 134*a* each include a contact surface 240*a* that faces the shaft portion 130 and an upwardly curved surface 240*b* located opposite the contact surface 240*a* across the shaft portions 124*a* and 134*a*.

[Plate Spring 228]

The plate spring 228 has a "U" shape that is open toward the main body 224 as seen in the medium width direction. The plate spring 228 has one end fixed to one end of the main body 224, and the other end fixed to the other end of the main body 224. The plate spring 228 includes a curved portion 228*a* that faces or is in contact with the curved surface 240*b* of each bearing 240 in the medium thickness direction.

(Operation)

In this configuration, a biasing force for biasing rollers 124 and 134 to rollers 128 and 138 is changeable by stopping the arm portion 152 while changing an inclination angle of the arm portion 152 with respect to the medium conveyance direction.

As illustrated in FIG. 7A, when the inclination angle of the arm portion 152 is set to form a large clearance between the protrusion 224*a* of the main body 224 and the contact surface 240*a* of each bearing 240, the curved portion 228*a* of the plate spring 228 strongly collides with the curved surface 240*b* of each bearing 240. Thus, the plate spring 228 is largely elastically deformed to apply a strong biasing force to the rollers 124 and 134.

As illustrated in FIG. 7B, when the inclination angle of the arm portion 152 is set to form a small clearance between the protrusion 224*a* of the main body 224 and the contact surface 240*a* of each bearing 240, the curved portion 228*a* of the plate spring 228 weakly collides with the curved surface 240*b* of each bearing 240. Thus, the plate spring 228 is slightly elastically deformed to apply a weak biasing force to the rollers 124 and 134.

As illustrated in FIG. 7C, when the inclination angle of the arm portion 152 is set such that the protrusion 224*a* of the main body 224 collides with the contact surface 240*a* of each bearing 240 and the shaft portions 124*a* and 134*a* are spaced away from the shaft portion 130, the curved portion 228*a* of the plate spring 228 is separated from the curved surface 240*b* of each bearing 240. Thus, the rollers 124 and 134 are respectively separated from the rollers 128 and 138.

(Summary)

As described above, in the medium conveyance device 200, the biasing member 220 is mounted to the distal end of the arm portion 152. This configuration reduces variations in mounting the biasing member 220 and reduces variations in biasing force, as compared with a case where the biasing member 220 is mounted to an apparatus main body 10*a*.

Also in the medium conveyance device 200, the biasing force for biasing the rollers 124 and 134 to the rollers 128 and 138 is changeable by stopping the arm portion 152 while changing the inclination angle of the arm portion 152.

The present disclosure has been described in detail using a specific exemplary embodiment; however, the present disclosure is not limited to this exemplary embodiment. It is apparent to a person skilled in the art that the present disclosure can take various other embodiments within the scope of the present disclosure. In each of the foregoing exemplary embodiments, the shaft portions 124*a* and 134*a* are moved by turning the arm portions 152. The shaft portions may alternatively be moved in the medium thickness direction, using a solenoid or the like. This case however does not produce an advantageous effect to be produced by moving the shaft portions 124*a* and 134*a* by turning the arm portions 152.

Also in each of the foregoing exemplary embodiments, in a case where a sheet member P is a thin sheet of paper, the rollers of each of the roller pairs 120*b* disposed at the center side are separated from each other. Alternatively, the rollers of each of the roller pairs 120*a* respectively disposed on the two ends may be separated from each other.

In the second exemplary embodiment, the biasing member 220 is mounted to the distal end of the arm portion 152. Alternatively, the biasing member 220 may be mounted to any member as long as the biasing member 220 is movable in the medium thickness direction. This case however does not produce an advantageous effect to be produced by mounting the biasing member 220 to the arm portion 152.

Also in each of the foregoing exemplary embodiments, the arm portions 152 are respectively disposed on the two ends of each of the rollers 124 and 134. Alternatively, one arm portion 152 may be disposed on one end of each of the rollers 124 and 134. This case however does not produce an advantageous effect to be produced by respectively disposing the arm portions 152 on the two ends of each of the rollers 124 and 134.

In the second exemplary embodiment, the plate spring 228 is used as an elastic member. The plate spring 228 may alternatively be replaced with a coil spring, a rubber member, or the like.

What is claimed is:

1. A medium conveyance device comprising:

a plurality of roller pairs arranged in a width direction of a recording medium, the plurality of roller pairs including at least two end-side roller pairs respectively located near two ends of the recording medium in the width direction and at least one center-side roller pair located at a center of the recording medium in the width direction, the plurality of roller pairs each including a pair of rollers that convey the recording medium while nipping the recording medium and are individually contactable with and separable from each other; and a contact and separation mechanism that moves a first roller of the pair of rollers of the at least one center-side roller pair in a thickness direction of the recording medium or moves a first roller of the pair of rollers of each of the at least two end-side roller pairs in the thickness direction of the recording medium, to make a difference in separation timing, wherein the contact and separation mechanism includes:

a shaft portion that extends in the width direction;

a rotator that rotates the shaft portion; and an arm portion that includes a proximal end fixed to the shaft portion and a distal end coming into contact with the first roller of the at least one center-side roller pair by rotation of the shaft portion so as to move the first roller in the thickness direction, wherein the contact and separation mechanism further includes another arm portions that include proximal ends fixed to the shaft portion and distal ends respectively coming into contact with the first rollers of the at least two end-side roller pairs by rotation of the shaft portion so as to move the first rollers in the thickness direction, and the contact and separation mechanism rotates the shaft portion to switch, in a stepwise manner, among a state in which the rollers of each roller pair are in contact with each other, a state in which the rollers of the at least one center-side roller pair or the rollers of each of the at least two end-side rollers are separated from each other, and a state in which the rollers of each roller pair are separated from each other.

2. The medium conveyance device according to claim 1, wherein the contact and separation mechanism includes at least two of the arm portions respectively located near two ends of the first roller of the at least one center-side roller pair in the width direction.

3. The medium conveyance device according to claim 1, wherein the contact and separation mechanism further includes a biasing member that is disposed on the distal end of the arm portion and biases a first roller to a corresponding second roller.

4. The medium conveyance device according to claim 2, wherein the contact and separation mechanism further includes a biasing member that is disposed on the distal end of the arm portion and biases the first roller to a second roller of the pair of rollers of the at least one center-side roller pair.

5. The medium conveyance device according to claim 1, wherein the contact and separation mechanism further includes a biasing member that is disposed on the distal end of the arm portion and biases the first roller to a second roller of the pair of rollers of the at least one center-side roller pair.

6. The medium conveyance device according to claim 3, wherein the biasing member includes an elastic member that is elastically deformed to generate a biasing force for biasing the first roller to the second roller, and the elastic member has a degree of deformation that changes by stopping the elastic deformation while changing a rotation angle of the shaft portion.

7. An image forming apparatus comprising:

the medium conveyance device according to claim 1; and an image forming section that forms an image on the recording medium conveyed by the medium conveyance device.

8. An image forming apparatus comprising:

the medium conveyance device according to claim 3; and an image forming section that forms an image on the recording medium conveyed by the medium conveyance device.

9. An image forming apparatus comprising:

the medium conveyance device according to claim 6; and an image forming section that forms an image on the recording medium conveyed by the medium conveyance device.

* * * * *